2,847,415
Patented Aug. 12, 1958

2,847,415

NEW ANTHRAQUINONE VAT DYESTUFFS

Maurice Grelat, Basel, and Walter Kern, Sissach, Switzerland, assignors to Ciba Limited, Basel, Switzerland, a Swiss firm No Drawing. Application February 15, 1954
Serial No. 410,463

Claims priority, application Switzerland
February 18, 1953

9 Claims. (Cl. 260—295.5)

This invention provides valuable new anthraquinone vat dyestuffs, namely linear polyanthrimidecarbazoles which contain at least four anthraquinone nuclei and at least one acylamino group in para-position with respect to a carbazole-NH-group. A dyestuff of this kind is, for example, that of the formula

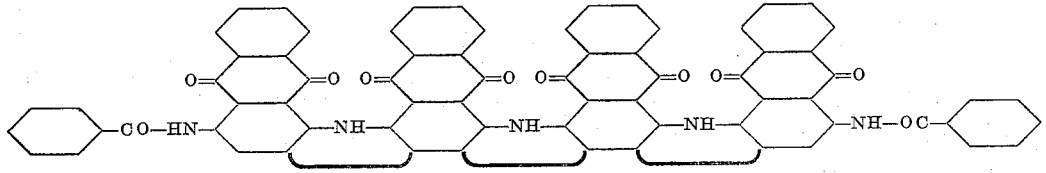

The invention also includes a process for making the above new dyestuffs by treating with a carbazolizing agent a linear polyanthrimide which contains at least four anthraquinone nuclei and at least one acylamino group in para-position with respect to an anthrimide bridge.

As linear polyanthrimides, which may be used as starting materials in the present process, there are used anthrimides built up of at least four anthraquinone nuclei, and in which all the anthrimide bonds are in 1:4-position (para-position) relatively to one another, so that the 4-position of one anthraquinone nucleus is connected to the 1-position of the adjacent anthraquinone nucleus by means of an —NH— group. At least one of the two end anthraquinone nuclei contain an acylamino group likewise in para-position relatively to the anthrimide bond.

It is especially advantageous to use polyanthrimides which contain four to six, preferably four or five anthraquinone nuclei, and especially valuable results are obtained with tetranthrimides. Furthermore, it is usually desirable to use polyanthrimides in which each of the end anthraquinone nuclei contains an acylamino group in para-position to the amide bridge.

It is of advantage to use polyanthrimides of which the acylamino groups correspond to the formula

—NH—OC—R in which R represents an aromatic radical of the naphthalene or advantageously the benzene series, for example, a benzene radical which is unsubstituted or substituted in a suitable manner, for example, by a halogen atom such as chlorine. Thus, the anthrimides may contain as a substituent, for example, a benzoylamino group, ortho- or meta- or para-chloro-benzoylamino group, an ortho-fluorobenzoylamino group, or a β-naphthoylamino or paraphenylbenzoylamino group. R may also represent an alkyl radical of low molecular weight such as an H₃C-radical or heterocyclic radical, for example a pyridine radical. However, the choice of the acyl radicals is not resricted to the above indicated radicals. Any acyl radicals from acetyl radicals to polycyclic acyl radicals, such as naphthoyl or phenyl-benzoyl may be present, provided the radicals contain no water-solubilizing groups. Moreover, the acyl radicals may contain substituents usually present in vat dyestuffs.

The polyanthrimides used as starting materials in the present process can be made by methods in themselves known by reacting an α-aminoanthraquinone with an α-halogen-anthraquinone. Thus, for example, 4:4′′′-diacylamino - 1:1′ - 4′:1′′ - 4′′:1′′′ - tetranthrimides can be made by condensing one mol of 4:4′-diamino-1:1′-dianthrimide with two mols of a 4-halogen-1-acylamino-anthraquinone. When linear polyanthrimides, which contain a single acylamino group are used as starting materials they can be obtained by condensing a 1-amino-4-halogen-anthraquinone, especially 1-amino-4-chloranthraquinone, with itself followed by acylation. The products so obtained are mixtures but they consist principally of anthrimides which contain at least four anthraquinone nuclei.

The condensations necessary to form the polyanthrimides can be carried out by methods in themselves known. In cases in which the usual solvents such as nitrobenzene possess too low a solvent power, which is especially the case with starting materials which already contain several anthraquinone nuclei in the molecule, there may be used as solvents higher hydrocarbons such, for example, as anthracene or phenanthrene.

As carbazolizing agents there may be used more especially the various known combinations of aluminium chloride with fluxing agents. However, in certain cases it is not known with certainty how far these fluxing agents form molecular compounds with aluminium chloride. As such fluxing agents there may be mentioned aromatic compounds such as nitrobenzene, inorganic compounds such as sodium chloride or sulfur dioxide, if desired, alone or in conjunction with one another. Advantageous results are usually obtained by using aluminium chloride with the addition of a tertiary base, for example, a tertiary base free from hydroxyl groups such, for example, as triethylamine. Especially suitable, however, are cyclic bases such, for example, as quinoline or acidine, and above all pyridine bases such as pyridine itself or its nearest homologues, for example, methyl pyridine such as α-picoline or mixtures of pyridine bases such as the commercial β:γ-picoline mixture.

The carbazolization of the polyanthrimide is advantageously carried out a temperatures within the range chloride are used an especially advantageous temperature of about 120–180° C. When pyridine and aluminium chloride are used an especially advantageous temperature is about 140° C., and the picolines, for example, enable the reaction to be carried out at a higher temperature up to about 180° C. Depending on the choice of the condensing agent and reaction temperature certain differences in the properties of the products obtained, especially in the case of pentanthrimides and higher anthrimides may occur, for example, with respect to the tints of the vat dyeings produced therewith.

The reaction mixture may be worked up in the usual manner, for example, by diluting it with water, rendering the mixture alkaline with an alkali hydroxide, and treatment with sodium hypochlorite, or vatting the dyestuff so obtained by the addition of a suitable reducing agent, such as sodium hydrosulfite, and then precipitating the dyestuff by oxidation, for example, with air. By the present process the theoretically possible extent of ring closure can easily be brought about practially completely in the case of tetranthrimides and in the case of higher anthrimides it occurs to at least one half the possible extent, and no doubt differences in the properties of the final products mentioned above are largely due to the fact that the carbazolization more or less nearly approaches completion depending on the reaction conditions. Accordingly, the vat dyestuffs obtainable by the present process correspond to the general formula

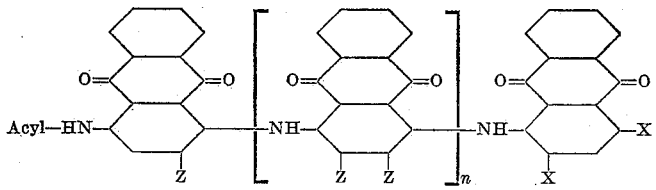

in which n represents a whole number greater than 1, and X represents a hydrogen atom or an acylamino group and at least one half of the radicals

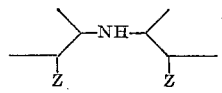

are atomic groupings of the formula

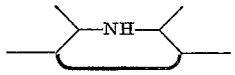

and the remainder of those radicals are atomic groupings of the formula

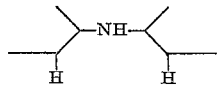

and, if desired, individual hydrogen atoms may be replaced by substituents.

These new dyestuffs can be used as pigments. They are especially suitable for dyeing and printing a very wide variety of fibers, epecially cellulose-containing fibers, such as cotton, linen, and artificial silk or staple fibers of regenerated cellulose. There are also obtained by the so-called hot dyeing process, that is to say, at a bath temperature of about 60° C. and with the use of a strongly alkaline vat, strong, predominantly grey to grey-olive, dyeings which are valuable by reason of their tints, especially the good matching of the tints on different cellulose-containing materials, and also by virtue of their properties of fastness.

The following examples illustrate the invention, the parts and percentages being by weight unless otherwise stated and the relationship of parts by weight to parts by volume being the same as that of the kilogram to the liter:

*Example 1*

35 parts of aluminium chloride are slowly introduced, while stirring, into 70 parts of pyridine. When the introduction is complete, there are added to the melt 7 parts of 4:4'''-dibenzoylamino-1:1'-4':1''-4'':1'''-tetranthrimide, and the temperature is raised to 138–140° C. in the course of 45 minutes. At that temperature the mixture is stirred for a further hour. The melt is then poured on to 1000 parts of ice. 200 parts of sodium hydroxide solution of 35 percent strength and 100 parts of sodium hypochlorite solution (10–12 percent of active chlorine) are added to the mixture. The reaction mixture is then maintained at 90° C. for one hour while stirring energetically, then filtered with suction, and the filter residue is washed neutral. The residue is then stirred in water, acidified with hydrochloric acid, and allowed to boil for a short time. The dyestuff is then filtered off with suction, washed neutral with water and dried. It is a dark powder which dissolves in concentrated sulfuric acid with a brown-black coloration and dyes cotton from a brown vat fast bluish grey tints.

The 4:4'''-dibenzoylamino - 1:1'-4':1''-4'':1''' - tetranthrimide may be prepared for example as follows:

15.3 parts of 4:4'-diamino-1:1'-dianthrimide, 26.5 parts of 4-chloro-1-benzoylaminoanthraquinone, 1 part of cuprous chloride, 10 parts of anhydrous sodium carbonate and 300 parts of naphthalene are stirred for 8 hours at 210—212° C. The reaction mixture is then allowed to cool to 140° C., and diluted with 300 parts of chlorobenzene. The mixture is filtered with suction while hot and the filter residue is washed with chlorobenzene. In order to remove the solvent the filter residue is subjected to steam distillation, then acidified with hydrochloric acid, filtered with suction, and washed neutral and dried. There is obtained a dark powder which dissolves in concentrated sulfuric acid with an olive green coloration.

*Example 2*

3.87 parts of 4:4'-diamino-1:1'-dianthrimide, 8.2 parts of 1-(para-phenyl-benzoylamino)-4-chloranthraquinone, 3 parts of sodium carbonate, 0.1 part of cuprous chloride and 150 parts of naphthalene are stirred for 8 hours at 210° C. The reaction mixture is then cooled to 150° C., and diluted with 100 parts of chlorobenzene. The mixture is filtered while hot and the filter residue is washed with chlorobenzene and then with alcohol. The filter residue is then boiled with dilute hydrochloric acid, filtered with suction, and the filter residue is washed with water until neutral and dried. There is obtained a dark product which dissolves in concentrated sulfuric acid with an olive coloration.

The latter product is carbazolized as described in the first paragraph of Example 1. The dyestuff is a dark powder which dissolves in concentrated sulfuric acid with a brown coloration, and dyes cotton from a brown vat fast grey tints.

*Example 3*

4.6 parts of 4:4'-diamino-1:1'-dianthrimide, 7.9 parts of 1 - (ortho-chlorobenxoylamino)-4-chloranthraquinone, 3 parts of sodium carbonate, 0.1 part of cuprous chloride and 200 parts of naphthalene are stirred for 8 hours at 210–212° C. The reaction mixture is then allowed to cool to 150° C., then diluted with 200 parts of chlorobenzene, filtered with suction while hot, and the filter residue is washed with chlorobenzene and then with alcohol. The filter residue is boiled with dilute hydrochloric acid, filtered with suction, and the filter residue is washed neutral with water and dried. There is obtained a dark product which dissolves in concentrated sulfuric acid with an olive coloration. This product is carbazolized as described in the first paragraph of Example 1. The dyestuff is a dark powder which dissolves in concentrated sulfuric acid with a brown coloration and dyes cotton from a brown vat fast blue-grey tints.

*Example 4*

11.5 parts of 4:4'-diamino-1:1'-dianthrimide, 19.6 parts of 1 - (para - methoxybenzoylamino) - 4 - chloranthraquinone, 0.5 part of cuprous chloride, 8 parts of sodium carbonate and 250 parts of naphthalene are stirred for 10 hours at 210–212° C. and allowed to cool to 150° C. At that temperature the mixture is diluted with 200 parts of chlorobenzene and filtered with suction while hot. The filter residue is washed with chlorobenzene and then with alcohol, boiled with dilute hydrochloric acid, filtered with suction, and the filter residue is washed neutral with water and dried. There is obtained a dark product which dissolves in concentrated sulfuric acid with an olive coloration. This product is carbazolized as described in the first paragraph of Example 1. The dyestuff is a dark powder which dissolves in concentrated sulfuric acid with a brown coloration and dyes cotton from a brown vat fast grey tints.

*Example 5*

7.65 parts of 4:4'-diamino-1:1'-dianthrimide, 12 parts of 1-acetylamino-4-chloranthraquinone, 6 parts of sodium carbonate, 0.7 part of cuprous chloride and 250 parts of nitrobenzene are stirred for 10 hours at 205–210° C. The mixture is then filtered with suction at 50° C., and the filter residue is washed with nitrobenzene and alcohol. It is then boiled with dilute hydrochloric acid, filtered with suction, and the filter residue is washed neutral with water and dried. There is obtained a dark product which dissolves in concentrated sulfuric acid with an olive coloration. The product is carbazolized as described in the first paragraph of Example 1. The dyestuff is a dark powder which dissolves in concentrated sulfuric acid with a brown coloration and dyes cotton from a brown vat fast grey tints.

*Example 6*

7.65 parts of 4:4'-diamino-1:1'-dianthrimide, 14.5 parts of 1 - nicotinoylamino - 4 - chloranthraquinone, 6 parts of sodium carbonate, 0.7 part of cuprous chloride and 250 parts of nitrobenzene are stirred for 10 hours at 205–210° C. The mixture is filtered with suction at 50° C. and the filter residue is washed with nitrobenzene and alcohol. It is then boiled with dilute hydrochloric acid, the mixture is filtered with suction, and the filter residue is washed neutral and dried. There is obtained a dark product which dissolves in concentrated sulfuric acid with a green coloration. The product is carbazolized as described in the first paragraph of Example 1. The dyestuff is a dark powder which dissolves in concentrated sulfuric acid with a brown coloration and dyes cotton from a brown vat fast neutral grey tints.

*Example 7*

6.65 parts of 4:4'-diamino-1:1'-dianthrimide, 14.1 parts of 1-(β-naphthoylamino)-4-chloranthraquinone, 5 parts of sodium carbonate, 0.7 part of cuprous chloride and 250 parts of nitrobenzene are stirred for 10 hours at 201–210° C. The mixture is filtered with suction at 50° C. and the filter residue is washed with nitrobenzene and then with alcohol. It is then boiled with dilute hydrochloric acid, the mixture is filtered with suction, and the filter residue is washed neutral with water and dried. There is obtained a dark product which dissolves in concentrated sulfuric acid with an olive coloration. The product is carbazolized as described in the first paragraph of Example 1. The dyestuff is a dark powder which dissolves in concentrated sulfuric acid with a brown coloration and dyes cotton from a brown vat fast olive-grey tints.

*Example 8*

13.3 parts of 4-amino-1:1'-4':1''-trianthrimide, 8 parts of 1-benzoylamino-4-chloranthraquinone, 4 parts of sodium carbonate, 0.5 part of cuprous chloride and 250 parts of naphthalene are stirred for 15 hours at 210–212° C. The reaction mixture is then allowed to cool to 150° C., and diluted with 200 parts of chlorobenzene. The mixture is then filtered with suction while hot, and the filter residue is washed with chlorobenzene and then with alcohol. The filter residue is then boiled with dilute hydrochloric acid, the mixture is filtered with suction, and the filter residue is washed neutral with water and dried. There is obtained a dark product which dissolves in concentrated sulfuric acid with an olive coloration. The product is then carbazolized as described in the first paragraph of Example 1. The dyestuff is a dark powder which dissolves in concentrated sulfuric acid with a brown coloration and dyes cotton fast grey tints from a brown vat.

*Example 9*

14.1 parts of 4-amino-4'-benzoylamino-1:1'-dianthrimide (obtained, for example, by condensing 1-amino-4-nitroanthraquinone with 1-benzoylamino-4-chloranthraquinone followed by reduction of the 1-benzoylamino-4'-nitro-1:1'-dianthrimide so obtained), 3.15 parts of 1:4-dichloranthraquinone, 4 parts of sodium carbonate, 0.5 part of cuprous chloride and 180 parts of nitrobenzene are stirred for 15 hours at 205–210° C. The reaction mixture is allowed to cool to 100–120° C. and filtered with suction. The filter residue is washed with nitrobenzene and then with alcohol. The filter residue is then boiled with dilute hydrochloric acid, the mixture is filtered with suction and the filter residue is washed neutral and dried. There is obtained a dark powder which dissolves in concentrated sulfuric acid with an olive coloration. The product is then carbazolized as described in the first paragraph of Example 1. The dyestuff is a dark powder which dissolves in concentrated sulfuric acid with a brown coloration and dyes cotton from a brown vat fast grey tints.

*Example 10*

20 parts of 1-amino-4-chloranthraquinone, 8 parts of sodium carbonate, 0.5 part of cuprous chloride and 300 parts of naphthalene are stirred for 15 hours at 210–212° C. The reaction mixture is then allowed to cool to 150° C. and diluted with 200 parts of chlorobenzene. The mixture is then filtered with suction, and the filter residue is washed with chlorobenzene and then with alcohol. The filter residue is then boiled with dilute hydrochloric acid, the mixture is filtered with suction, and the filter residue is washed neutral with water and dried. The product is stirred with 200 parts of nitrobenzene and 10 parts of benzoyl chloride for 4 hours at 160–170° C., then filtered with suction at 60° C., and the filter residue is washed with nitrobenzene and then with alcohol and dried. There is obtained a dark powder which dissolves in concentrated sulfuric acid with a green coloration. This product is carbazolized as described in the first paragraph of Example 1. The dyestuff is a dark powder which dissolves in concentrated sulfuric acid with a brown coloration and dyes cotton from a brown vat fast grey tints.

*Example 11*

50 parts of aluminium chloride and 7 parts of sodium chloride are melted together. 5 parts of 4:4'''-dibenzoylamino-1:1'-4':1''-4'':1'''-tetranthrimide are added at 120° C. and the temperature is raised to 140° C. At this temperature the mixture is stirred for 3 hours, and then the melt is poured on to about 500 parts of ice. The resulting mixture is rendered alkaline with 200 parts of sodium hydroxide solution of 35 percent strength and stirred with 70 parts of sodium hypochlorite solution (10–12 percent of active chlorine) for one hour at 90° C. The mixture is filtered with suction while hot, and the residue is washed with water. The filter residue is then boiled with dilute hydrochloric acid, the mixture is filtered with suction, and the filter residue is washed neutral with water and dried. The dyestuff is a dark powder which dissolves in concentrated sulfuric acid with a brown coloration and dyes cotton from an orange-brown vat fast grey tints.

*Example 12*

1.5 parts of the dyestuff obtained as described in the first paragraph of Example 1 are vatted at about 50° C. in 150 parts of water with the addition of 3 parts of sodium hydrosulfite and 6 parts by volume of sodium hydroxide solution of 30 percent strength. The resulting stock vat is added to a dyebath consisting of 2000 parts of water, which contains 4 parts by volume of sodium hydroxide solution of 30 percent strength and 2 parts of sodium hydrosulfite. 100 parts of cotton yarn are entered into the dyebath at 40° C., after ¼ hour 20 parts of sodium chloride are added, and dyeing is carried on for one hour at 40–50° C. The cotton is then squeezed, oxidized, rinsed in cold water, acidified, again rinsed and finally soaped at the boil for ½ hour. It is dyed a fast bluish grey tint.

What is claimed is:

1. An anthraquinone vat dyestuff which corresponds to the formula

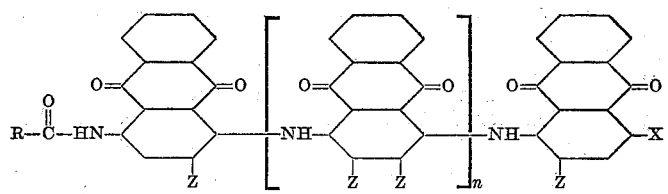

in which $n$ represents a whole number greater than 1, R is a member selected from the group consisting of alkyl, unsubstituted aryl, halo-aryl, alkoxyaryl and pyridino radicals, X represents a member selected from the group consisting of a hydrogen atom, a chlorine atom and $$R-\overset{O}{\underset{\|}{C}}-$$

group, and in which at least one half of the radicals

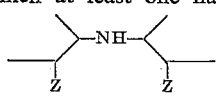

represent atomic groupings of the formula

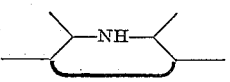

and the remainder of those radicals represent atomic groupings of the formula

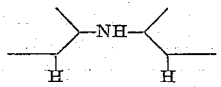

2. An anthraquinone vat dyestuff which corresponds to the formula

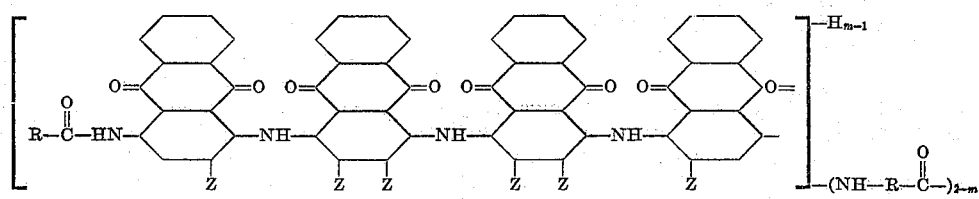

in which $m$ represents a whole number of at the most 2, R is a member selected from the group consisting of alkyl, aryl, halo-aryl, alkoxyaryl and pyridino radicals, and in which at least one half of the radicals

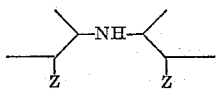

represent atomic groupings of the formula

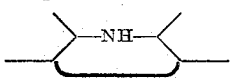

and the remainder of those radicals represent atomic groupings of the formula

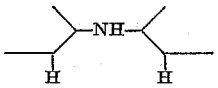

3. An anthraquinone vat dyestuff which corresponds to the formula

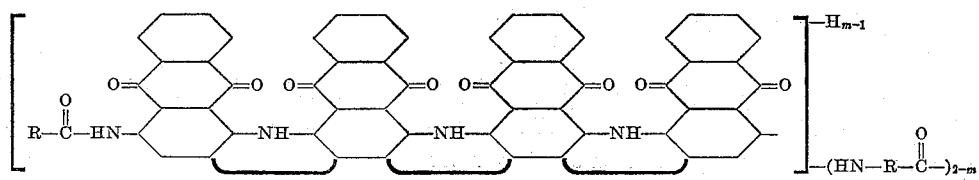

in which $m$ represents a whole number of at the most 2, and R is a member selected from the group consisting of alkyl, aryl, halo-aryl, alkoxyaryl and pyridino radicals.

4. An anthraquinone vat dyestuff which corresponds to the formula

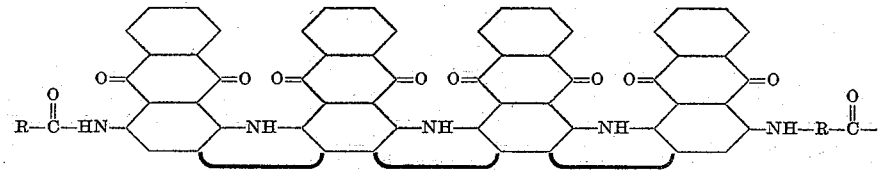

in which R is a member selected from the group consisting of alkyl, aryl haloaryl, alkoxyaryl and pyridino radicals.

5. The anthraquinone vat dyestuff which corresponds to the formula

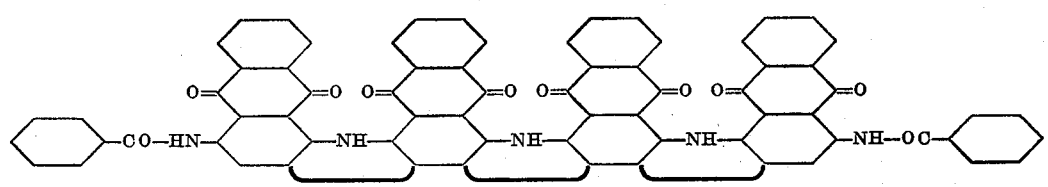

6. The anthraquinone vat dyestuff which corresponds to the formula

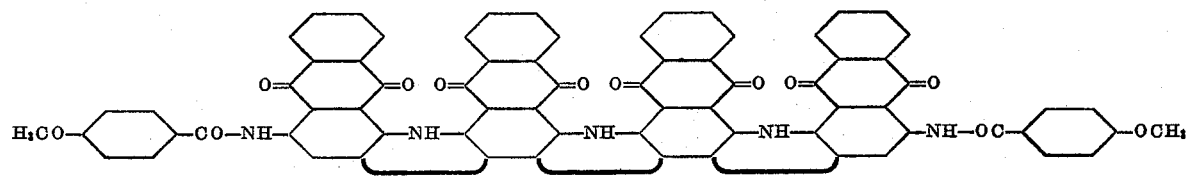

7. The anthraquinone vat dyestuff which corresponds to the formula

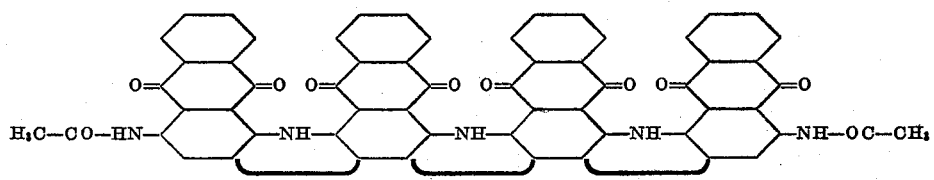

8. The anthraquinone vat dyestuff which corresponds to the formula

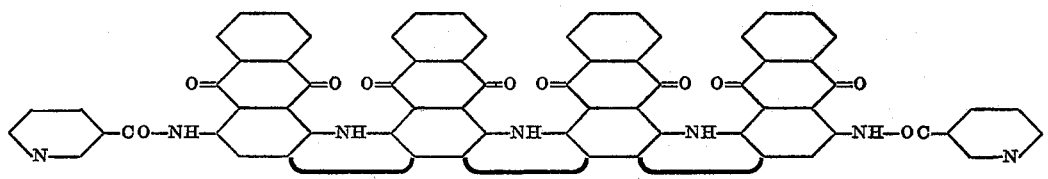

9. The anthraquinone vat dyestuff which corresponds to the formula

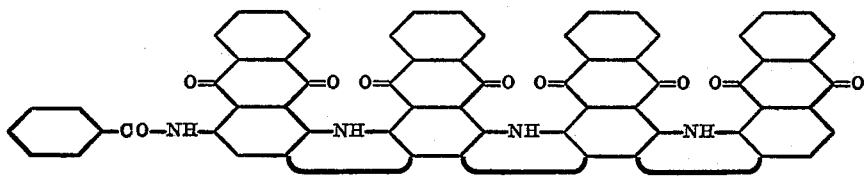

References Cited in the file of this patent

UNITED STATES PATENTS

| | | |
|---|---|---|
| 970,278 | Thomaschewski et al. | Sept. 13, 1910 |
| 2,030,253 | Hauser et al. | Feb. 11, 1936 |
| 2,385,113 | Smyth | Sept. 18, 1945 |
| 2,539,192 | Kern | Jan. 23, 1951 |
| 2,539,193 | Kern | Jan. 23, 1951 |
| 2,672,462 | Grelat et al. | Mar. 16, 1954 |

FOREIGN PATENTS

| | | |
|---|---|---|
| 505,611 | Great Britain | May 15, 1939 |

UNITED STATES PATENT OFFICE
Certificate of Correction

August 12, 1958

Patent No. 2,847,415

Maurice Grelat et al.

It is hereby certified that error appears in the printed specification of the above numbered patent requiring correction and that the said Letters Patent should read as corrected below.

Column 2, line 50, for "acidine" read —acridine—; line 55, for "a" read —at—; line 56, strike out "chloride are used an especially advantageous temperature"; column 3, line 3, for "practially" read —practically—; line 44, for "epecially" read —especially—; column 4, line 52, for "-chlorobenxoylamino)-" read — -chlorobenzoylamino)- —; columns 7 and 8, claim 4, the lower right-hand portion of the formula should appear as shown below instead of as in the patent—

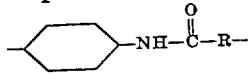

column 8, line 74, after "aryl" insert a comma.

Signed and sealed this 5th day of May 1959.

[SEAL]

Attest:
KARL H. AXLINE,
Attesting Officer.

ROBERT C. WATSON,
*Commissioner of Patents.*